July 8, 1958 G. O. GRAVES 2,842,072
FOOD PROCESSING MACHINE
Filed March 21, 1956 3 Sheets-Sheet 1

INVENTOR.
GEORGE O. GRAVES
BY
M. A. Hobbs
ATTORNEY

July 8, 1958 G. O. GRAVES 2,842,072
FOOD PROCESSING MACHINE
Filed March 21, 1956 3 Sheets-Sheet 2

INVENTOR.
GEORGE O. GRAVES
BY
M. A. Hobbs
ATTORNEY

July 8, 1958 G. O. GRAVES 2,842,072
FOOD PROCESSING MACHINE
Filed March 21, 1956 3 Sheets-Sheet 3

INVENTOR.
GEORGE O. GRAVES
BY M. A. Hobbs
ATTORNEY 2,842,072
FOOD PROCESSING MACHINE
George O. Graves, Mishawaka, Ind.
Application March 21, 1956, Serial No. 572,849
5 Claims. (Cl. 107—14)

The present invention relates to a food processing machine and more particularly to a machine for producing cereal products such as corn meal sticks or collets.

In the processing of corn meal to produce collets, the meal is first mixed with water in an amount less than that required to form a paste, and the resultant mixture is ground and extruded at a temperature sufficiently high to vaporize the moisture in the corn meal mix. The material as it emerges from the extrusion die, from which it is severed into sections of the desired length, is cylindrical in shape, highly cellular and relatively brittle. The material thus produced is further processed by baking, salting and coating with a cheese mix and is then packaged ready for shipping. The final product to be satisfactory must be uniform in texture and flavor and should be substantially the same size and shape. Normally considerable care and skill must be exercised in the operation of the machine used in the production of the untreated collets or sticks if a satisfactory product is to be obtained. Since operators having the necessary skill for properly assembling and operating the machine are always available, it is important that the care and operation of the machine be made sufficiently simple that unskilled help can perform those functions.

It is one of the principal objects of the present invention to provide a machine and an extrusion head or die therefor for performing the foregoing operation which will consistently produce cereal sticks or collets of uniform texture, size and shape and which can be placed in operation with a minimum amount of time and effort.

Since the extruding operation is performed at an elevated temperature, before the operation can be started, the extruding head must first be heated to the required temperature. One of the objects of the present invention is to provide an extrusion head which will heat rapidly to the desired temperature and thereafter maintain the proper temperature without further application of external heat.

Another object is to provide a one piece extrusion head or die for a machine of the aforesaid type, which can be readily fabricated and easily assembled on and removed from said machine and which embodies a simplified mode of operation.

Another object of the present invention is to provide a mechanism for producing untreated cereal collets, which can readily be assembled for operation and easily serviced and cleaned between operations.

Still another object of the invention is to provide a machine of the aforesaid type wherein the extrusion head or die can be readily and accurately mounted in operating position in the machine and easily disassembled and cleaned after operation of the machine has been completed.

In order to obtain the foregoing objects and other objects which will become apparent from the following description, the present machine includes a hopper for the corn meal, a mixing chamber which receives the meal from the hopper and mixes it with a small amount of water, a one piece plate die through which the mix is extruded in a single operation, and a means for receiving the mix from the mixing chamber and forcing it through the extrusion die while said die is maintained at a temperature sufficient to vaporize the moisture initially in the meal and that added to form the mix. As the material leaves the die the vaporized moisture expands, producing a highly cellular, prebaked material. A power operated knife or the like synchronized with the operation of the means propelling the meal through the die is provided for cutting the extruded material into the desired lengths. These sticks or sections of extruded and puffed material are referred to in the trade as "collets."

My invention may be more fully understood by reference to the accompanying drawings, wherein.

Figure 1:
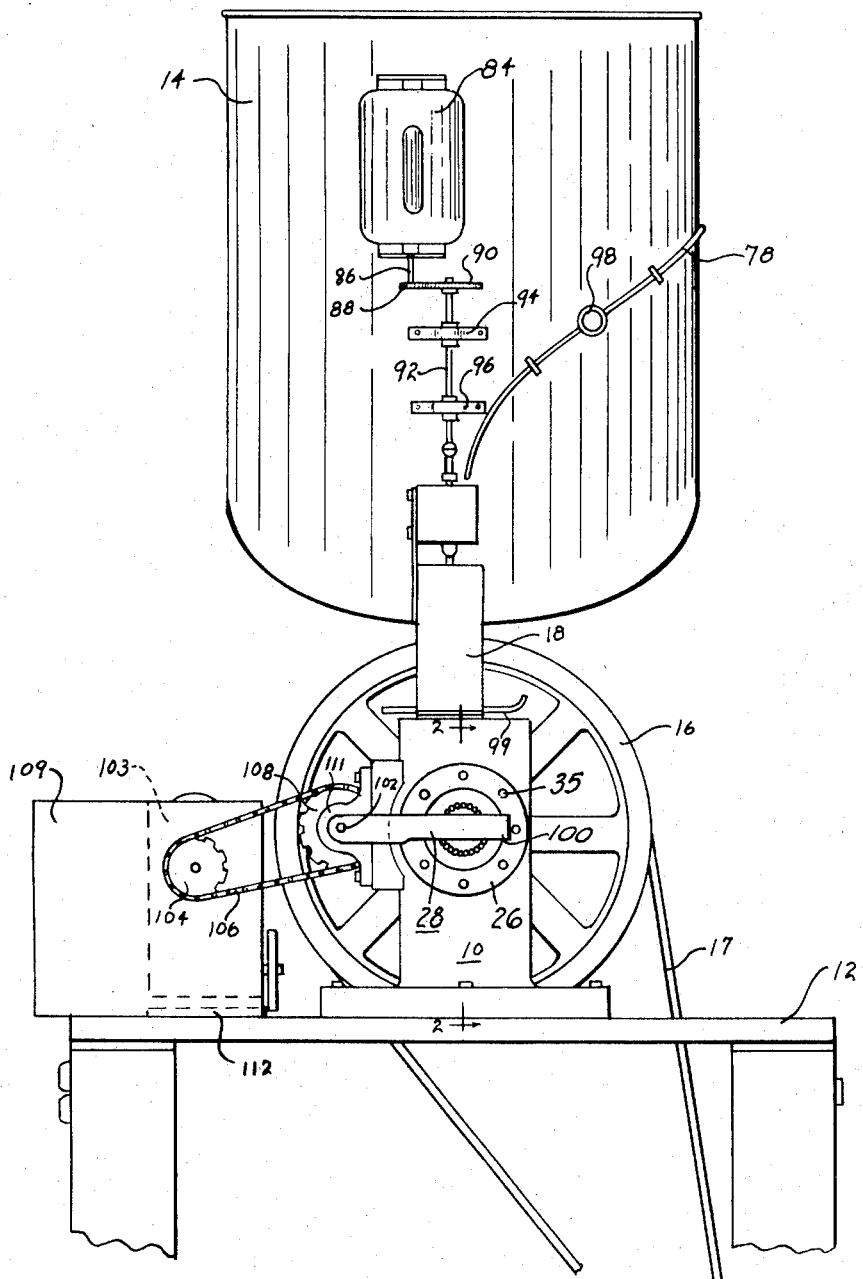
Figure 1 is a front elevational view of my machine, showing only a portion of the base on which it is mounted.
Figure 2:
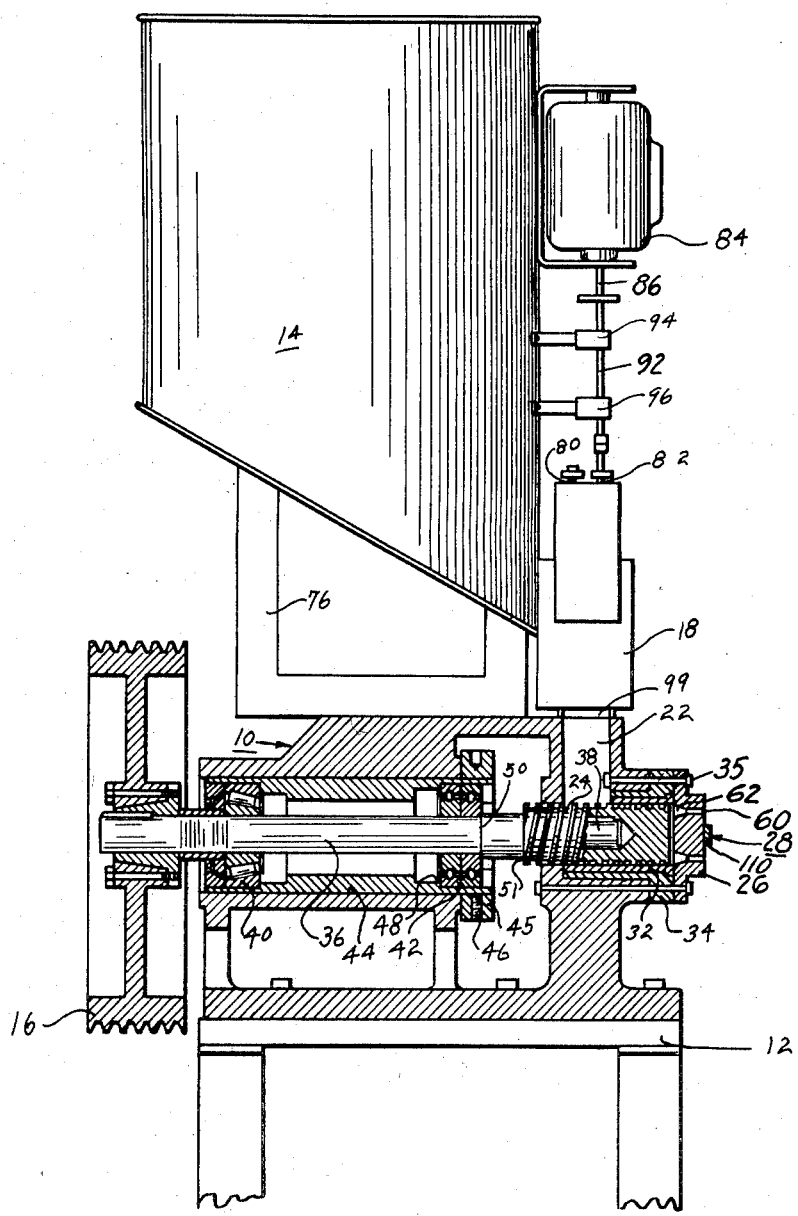
Figure 2 is a side elevational view and partial cross-sectional view of the machine, the section being taken on line 2—2 of Figure 1.
Figure 3:
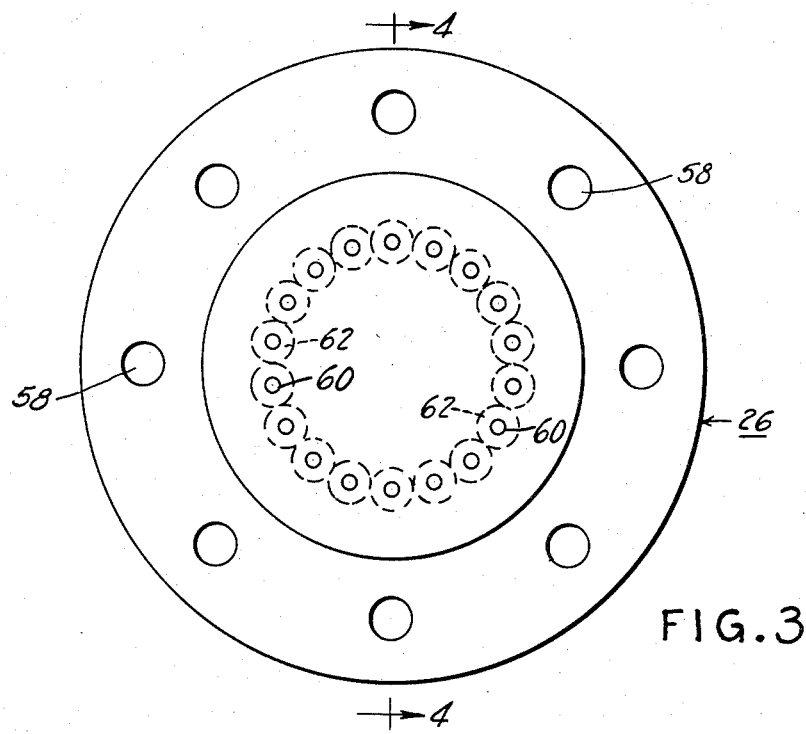
Figure 3 is an enlarged front outside elevational view of the extrusion die, shown removed from the machine.

Referring more specifically to the drawings, a housing 10 which contains the meal extruding mechanism is mounted on a base 12 and supports a hopper 14 for the corn meal ready to be processed by the machine. The meal extruding mechanism is driven through a pulley 16 and a plurality of V-belts 17 by a motor (not shown) mounted in the lower portion of base 12, and is supplied with corn meal from hopper 14 through a chamber 18 in which the meal is mixed with a small amount of moisture, thoroughly stirred and thence discharged into the throat 22 of the extruding mechanism. This mixture is propelled by a screw 24 toward the right, as shown in Figure 2, and extruded through the holes in a head plate 26 at a temperature sufficiently high to vaporize the moisture in the mixture and to prebake the material sufficiently to render it relatively brittle. As the material emerges from the holes in the head plate in cylindrical form it is cut into sections of the desired length by a revolving power driven knife 28. The sections fall into a chute and thence into a container placed below the machine.

The extruding mechanism is mounted in the housing and consists of screw 24, an insert 32 in which the screw rotates, and head plate 26 through which the meal is extruded under the pressure created by rotation of the screw propelling the meal toward the plate. Insert 32 which may have either a smooth internal surface or a helical groove resembling the screw threads on screw 24 is seated in an adapter 34 disposed in a horizontal bore in the housing. The adapter and sleeve are held in place in the bore by a plurality of bolts or screws 35 extending through the holes in the marginal portion of the head plate and in the upright in which those elements are seated, said bolts also securing said plate to the end of the adapter and sleeve. Screw 24 is driven by the motor through pulley 16 and shaft 36 which is connected to said screw by a spline 38 and is journalled in roller bearing 40 and thrust bearing 42 mounted in the ends of sleeve 44 disposed in a horizontal bore in the housing and held in a fixed position by a collar 45 and set screw 46. Thrust bearing 42 is supported against axial movement away from screw 24 by an annular shoulder 48 on the internal surface of sleeve 44 and shaft 36 is supported against similar axial movement by an annular shoulder 50 on said shaft bearing against the thrust bearing. A second annular shoulder 51 on shaft 36 forms an abutment for screw 24 and prevents it from moving away from the head plate under the pressure created by the screw propelling the meal toward and through the plate.

The head plate 26 which is secured to the end of adapter 34 and sleeve 32 by bolts 35 through holes 58 in the plate consists of a cylindrical block of metal having a plurality of longitudinal holes 60 therein arranged in a circle in the center portion of the plate and communicating with the bore in insert 32 in which screw 24 rotates. These holes have a conical inlet 62 from the inside surface of the plate and the holes are so spaced relative to one another that the openings into the conical inlets are substantially in contact with one another. The position of the conical inlets 62 relative to the discharge end of the threaded periphery of screw 24 is such that the cereal mix is fed directly from the screw into said conical portions thereby encountering little or no resistance in the even flow of the mixture from the screw to and through the holes in plate 26. This relationship between the inlets 62 and the discharge end of the screw, together with the straight uninterrupted flow of the mix through the holes in the plate contributes in a major way to the production of a uniform product by the present machine. Another important factor in the production of a uniform product is the thickness of the plate. The plate must have substantial thickness in the section between the small end of the conical portion of holes 60 and the front face 66 of the plate. The substantial thickness, which has the effect of prolonging the time required for the mix to pass through the plate, gives the heat in the plate sufficient time to vaporize the moisture and thereafter to prebake the collets so that they will be uniformly cellular and will retain their size and shape after they are discharged from the plate. A plate with a substantially thicker section than that shown in the drawings tends to over bake the product before it is discharged from holes 60, causing it to be unduly brittle and often appear scorched. The thickness of the plate is preferably greater than the largest diameter of the holes 60 in said plate.

After the machine has been stopped and permitted to cool the mix in the holes in the plate tends to adhere to the metal and often must be punched out of the holes after the plate has been removed from the machine. By the present arrangement, the material can readily be driven from the holes with a punch or the like inserted therein from the small end. Another advantage of my one-piece die construction is that there are no cracks and crevices in which the mix can become embedded during the operation of the machine and from which it must be cleaned between successive operations of the machine.

Hopper 14 which is mounted above housing 10 on a fixture 76 is a cylindrical container having an open top and a sloping bottom which feeds the dry meal into chamber 18 where a small amount of water from supply pipe 78 is added and the resulting mixture is stirred thoroughly by a pair of rotating beaters mounted on stems 80 and 82 and driven by a motor 84 through shaft 86, reducing gears 88 and 90 and shaft 92, said latter shaft being journalled in and supported by bearings 94 and 96 mounted on the side of the hopper. The amount of moisture which is added to the meal in chamber 18 is controlled by a valve 98 in pipe 78, the amount of water being less than that required to form paste. After the meal and water have been thoroughly stirred in chamber 18 the mixture is discharged into throat 22 of the housing and is carried from there by screw 24 to the head plate and extruded through holes 60. The rate at which the mixture is fed to the extruding mechanism is controlled by a sliding door or valve 99 at the bottom of chamber 18.

Knife 28 for cutting the extruded material into sections as it emerges from holes 60 consists of a blade 100 mounted on the end of a shaft 102 which is driven by a motor (not shown) through a gear reduction box 103, sprocket 104, chain 106 and sprocket 108 mounted on the end of shaft 102 opposite the knife blade, said gear reduction box being mounted on a supporting member 109 secured to the base. The cutting edge of the blade is merely a square corner 110 on the forward edge of the blade and is adapted to shear the material from the plate by passing in close proximity thereto. Shaft 102 is journalled in bearings 111 which are supported by housing 10. The motor for driving the blade is mounted behind box 103 on an adjustable motor mount secured to member 112 and is provided with a conventional variable speed pulley so that the speed at which the blade revolves can be synchronized with the rate at which the material is being extruded from the head plate and can be varied relative to said rate to vary the length of the sections into which the extruded material is cut.

In the operation of the foregoing machine, corn meal or the like is added to hopper 14 from the top, and head plate 26 and adjacent portions of the insert, adapter and housing are heated with any suitable type of heating means such as a gas flame or an electrical heating element, until the temperature of these members has been raised to a point above that required to cause vaporization of the moisture in the corn meal mixture. The motor for driving the extruding mechanism, the motor for driving the beaters in chamber 18 and the motor for driving knife 28 are all placed in operation. The meal is then permitted to flow from hopper 14 into chamber 18 where it is mixed by the beaters with a small amount of water from supply pipe 78, and the resultant mixture is permitted to fall into throat 22 in the housing above screw 24. Rotation of the screw moves the mixture from the throat and propels it under substantial pressure into conical portions 62 of the head plate, causing it to flow through the holes. Since the temperature of the head plate is somewhat above the vaporization point of the moisture in the mixture, the moisture vaporizes causing the mixture mass to expand and become cellular throughout and light in texture. The temperature at which this vaporization takes place is sufficient to prebake the mixture as it passes through the head plate causing it to become firm and somewhat brittle after it leaves the plate. As the material emerges from the head plate it immediately puffs and revolving knife 28 passing intermittently in front of the plate severs the extruded puffed material into sections of the desired length. The speed at which the knife revolves in relation to the rate at which the material is extruded determines the length of the sections. These sections of material represent an intermediate stage in the production of collets, the further steps including a final baking operation, salting and coating with a cheese mix or any other desirable coating mix. The material produced by the machine disclosed herein may be packaged and shipped to other plants and customers where the additional processing steps are performed.

Once the machine is placed in operation no external heat need be applied to the head plate to maintain the temperature at the point required to vaporize the moisture in the corn meal mixture since the pressure created by screw 24 in forcing the mixture through the head plate creates sufficient heat to maintain the plate at the required temperature for satisfactory operation of the machine. By having the extrusion holes all in one head plate, the machine can be readily assembled without the assistance of any skilled mechanics or special tools and can be placed in operation with a minimum amount of time required to preheat the head plate. Further, when the machine is disassembled after it has been in operation, the head plate can easily be cleaned of the meal mixture remaining there after discontinuing the operation.

Figures 4, 5:
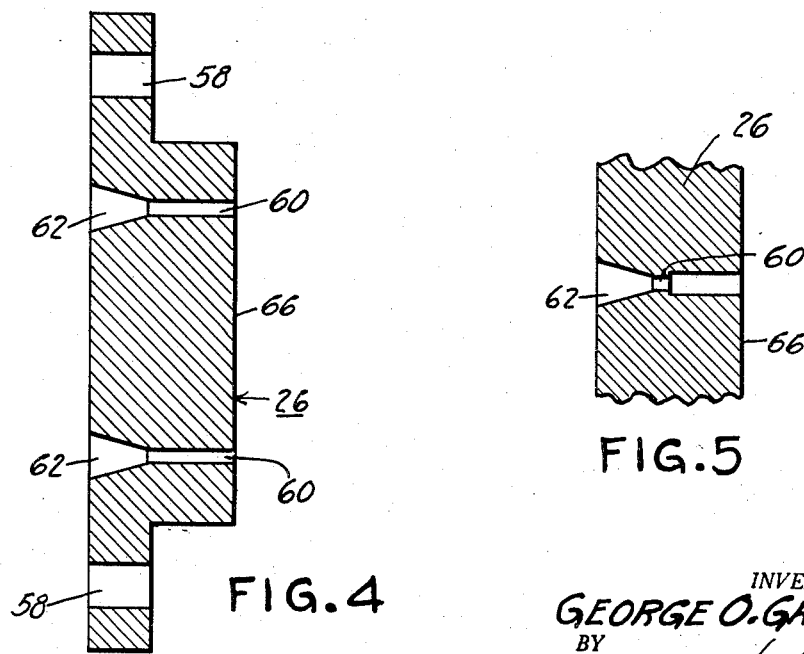
Figure 4 is an enlarged cross-sectional view of the extrusion die, taken on line 4—4 of Figure 3.
Figure 5 is a fragmentary cross-sectional view of my plate showing a modified form of the extrusion holes therethrough.

A modified form of the extrusion holes in plate 26 is shown in Figure 5. Since the mix expands when heated by the plate, holes 60 are enlarged somewhat at the outlet portion 120 to allow more space for the expansion. A further expansion in the mix usually takes place, both in this modification and in the previously described embodiment, when the heated mix emerges from holes 60 at face 66.

While in the foregoing description reference has been primarily made to the production of collets from corn meal, the machine can be used to produce similar products from other cereals.

Various changes and modifications can be made in the machine and parts of the machine disclosed herein without departing from the scope of the invention.

I claim:

1. In a machine for extruding and puffing cereal meal: a housing having a bore therein, a rotatable member in said bore having a helical ridge on the periphery thereof, an extrusion die plate mounted on said housing across said bore and having a plurality of extrusion holes extending through the plate and communicating directly with the area in said bore occupied by the ridged periphery of said member, each of said holes having an inlet portion tapering inwardly and a cylindrical portion connected to said tapered portion and extending through the plate to the outside surface thereof, the total cross sectional area of said cylindrical portions being sufficiently less than the cross sectional area of said bore occupied by said helical ridge and the length of said cylindrical portions being sufficiently great to creat sufficient friction and pressure to raise the temperature of the meal being fed therethrough to prebake said meal before it is expelled from said holes.

2. In a machine for extruding and puffing cereal meal: a housing having a bore therein, a rotatable member in said bore having a helical ridge on the periphery thereof, an extrusion die plate mounted on said housing across said bore and having a plurality of extrusion holes extending through the plate and communicating directly with the area in said bore occupied by the ridged periphery of said member, each of said holes having an inlet portion tapering inwardly and a cylindrical portion connected to said tapered portion and extending through the plate to the outside surface thereof, the total cross sectional area of said cylindrical portions being sufficiently less than the cross sectional area of said bore occupied by said helical ridge and the length of said cylindrical portions being sufficiently great to create sufficient friction and pressure to raise the temperature of the meal being fed therethrough to prebake said meal before it is expelled from said holes, an annular flange on the periphery of said plate having a plurality of spaced holes therein, and means extending through said last mentioned holes for securing said plate to said housing.

3. In a machine for extruding and puffing cereal meal: a housing having a bore therein, a rotatable member in said bore having a helical ridge on the periphery thereof, an extrusion die plate mounted on said housing across said bore and having a plurality of extrusion holes extending through the plate and communicating directly with the area in said bore occupied by the ridged periphery of said member, each of said holes having an inlet portion tapering inwardly and a cylindrical portion connected to said tapered portion and extending through the plate to the outside surface thereof, the total cross sectional area of said cylindrical portions being sufficiently less than the cross sectional area of said bore occupied by said helical ridge and the length of said cylindrical portions being sufficiently great to creat sufficient friction and pressure to raise the temperature of the meal being fed therethrough to prebake said meal before it is expelled from said holes, and a means for engaging the marginal edge of said plate for removably securing said plate to said housing.

4. In a machine for extruding and puffing cereal meal: a housing having a bore therein, a rotatable member in said bore having a helical ridge on the periphery thereof, an extrusion die plate mounted on said housing across said bore and having a plurality of extrusion holes extending through the plate and communicating directly with the area in said bore occupied by the ridged periphery of said member, each of said holes having an inlet portion tapering inwardly and a cylindrical portion connected to said tapered portion and extending through the plate to the outside surface thereof, the total cross sectional area of said cylindrical portions being sufficiently less than the cross sectional area of said bore occupied by said helical ridge and the length of said cylindrical portions being sufficiently great to creat sufficient friction and pressure to raise the temperature of the meal being fed therethrough to prebake said meal before it is expelled from said holes, an annular flange on the periphery of said plate having a plurality of spaced holes therein, means extending through said last mentioned holes for securing said plate to said housing, and a knife means intermittently passing the outlet ends of said extrusion holes for cutting the extruded material into sections.

5. In a machine for extruding and puffing cereal meal: a housing having a bore therein, a rotatable member in said bore having a helical ridge on the periphery thereof, an extrusion die plate mounted on said housing across said bore and having a plurality of extrusion holes extending through the plate and communicating directly with the area in said bore occupied by the ridged periphery of said member, each of said holes having an inlet portion tapering inwardly and an elongated portion connected to said tapered portion and extending through the plate to the outside surface thereof, the total cross sectional area of said elongated portions being sufficiently less than the cross sectional area of said bore occupied by said helical ridge and the length of said elongated portions being sufficiently great to creat sufficient friction and pressure to raise the temperature of the meal being fed therethrough to prebake said meal before it is expelled from said holes, and a knife means intermittently passing the outlet ends of said extrusion holes for cutting the extruded material into sections.

References Cited in the file of this patent

UNITED STATES PATENTS

| | | |
|---|---|---|
| 1,402,672 | Sizer | Jan. 3, 1922 |
| 1,862,947 | Smith et al. | June 14, 1932 |
| 1,925,010 | Sizer | Aug. 29, 1933 |
| 1,999,926 | Garzia | Apr. 10, 1935 |
| 2,049,754 | Tanzi | Aug. 4, 1936 |
| 2,059,486 | Payne et al. | Nov. 3, 1936 |
| 2,068,220 | Baechi | Jan. 19, 1937 |
| 2,274,220 | Sticelber | Feb. 28, 1942 |
| 2,661,295 | Francis et al. | Dec. 1, 1953 |
| 2,705,927 | Graves | Apr. 12, 1955 |
| 2,725,829 | Hawthorn | Dec. 6, 1955 |
| 2,792,304 | Pavan | May 14, 1957 |

UNITED STATES PATENT OFFICE
CERTIFICATE OF CORRECTION

Patent No. 2,842,072                                                   July 8, 1958

George O. Graves

It is hereby certified that error appears in the printed specification of the above numbered patent requiring correction and that the said Letters Patent should read as corrected below.

Column 1, lines 35 and 36, for "are always available," read -- are not always available, --.

Signed and sealed this 11th day of November 1958.

(SEAL)
Attest:

KARL H. AXLINE                                           ROBERT C. WATSON
Attesting Officer                                      Commissioner of Patents